(12) United States Patent
Miyagawa

(10) Patent No.: US 6,917,376 B2
(45) Date of Patent: Jul. 12, 2005

(54) EXPOSING DEVICE AND IMAGE MAGNIFICATION ADJUSTING METHOD

(75) Inventor: Ichirou Miyagawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/243,852

(22) Filed: Sep. 16, 2002

(65) Prior Publication Data

US 2003/0053038 A1 Mar. 20, 2003

(30) Foreign Application Priority Data

Sep. 20, 2001 (JP) ........................................ 2001-286413

(51) Int. Cl.⁷ .............................. B41J 27/00; G02B 7/02
(52) U.S. Cl. ...................................... 347/258; 359/823
(58) Field of Search ................................ 347/241–244, 347/256–258; 359/819–823, 210, 641, 678; 250/201.2; 348/347; 355/67

(56) References Cited

U.S. PATENT DOCUMENTS 5,237,367 A * 8/1993 Kudo ........................... 355/67
5,469,290 A * 11/1995 Maeda ......................... 359/210
5,745,296 A * 4/1998 Nakamura et al. ........... 359/641
5,923,473 A * 7/1999 Kelley et al. ................. 359/618
6,621,521 B1 * 9/2003 Ohta ............................ 348/345

* cited by examiner

Primary Examiner—Hai Pham
(74) Attorney, Agent, or Firm—Sughrue Mion, PLLC

(57) ABSTRACT

An exposing device including an optical fiber array with a plurality of optical fibers disposed at a predetermined interval, a first lens, and a second lens. The optical fiber array is mounted on a base seat supported on a rail movably along an optical axis direction. The first lens is mounted in a casing. The casing is mounted on a base seat supported on a rail movably along the optical axis direction. The second lens is mounted in a casing, and the casing is supported by a supporting member mounted on a base seat. In the case of changing imaging magnification, a moving amount of the optical fiber array and a moving amount of the first lens corresponding to the imaging magnification provided for the changing operation are each set so as to be moved.

23 Claims, 12 Drawing Sheets

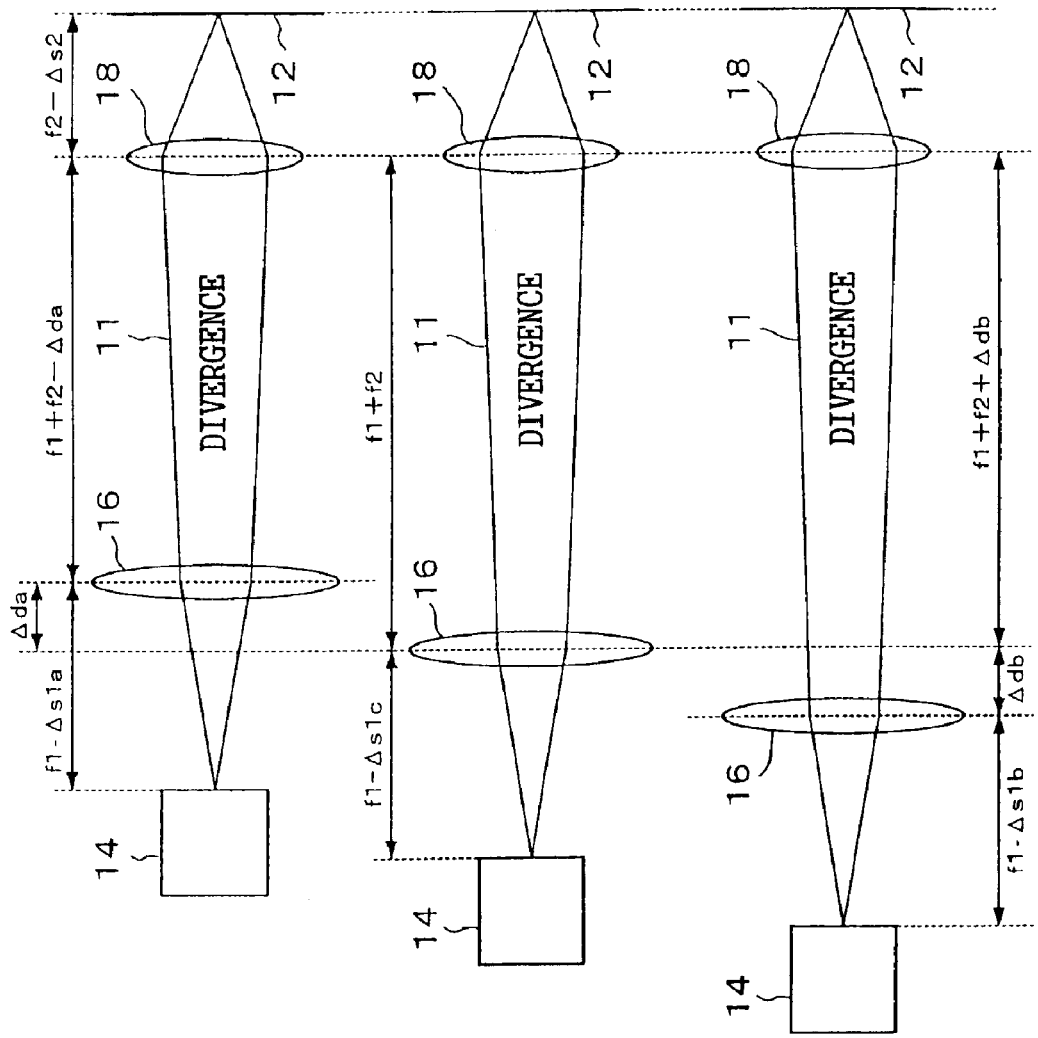

EXPOSING DEVICE AND IMAGE MAGNIFICATION ADJUSTING METHOD

BACKGROUND OF THE INVENTION

1. Field of the Invention

The present invention relates to an exposing device and an imaging magnification adjusting method, and in particular, relates to an exposing device and an imaging magnification adjusting method used for an image recording device or the like.

2. Description of the Related Art

Conventionally, an image recording device for recording an image by scanning on a photosensitive drum rotating in a predetermined direction (main scanning direction) with a light beam modulated according to the image in a direction substantially orthogonal to the predetermined direction (sub scanning direction), is known.

According to the image recording device, an exposing device comprising a multi beam light source for emitting light beams from a plurality of light emitting points disposed with a predetermined interval in the sub scanning direction, and a lens group for collecting the light beams on the photosensitive drum can be used for recording the image at a high speed or the like.

Moreover, recently, in the exposing device using the multi beam light source, changeover of the imaging magnification of the light beam according to a plurality of resolutions, such as 2,400 dpi (dot per inch), 2,438 dpi, 2,540 dpi, or the like, is desired.

Conventionally, the imaging magnification has been changed over by increasing the number of lenses in the exposing device and moving the lenses according to the resolution.

However, according to the conventional technique, since the number of lenses should be increased, the device is bulky and expensive.

In order to solve the problem, as shown in FIGS. 8A to 8C, a technique for changing the imaging magnification in an exposing device comprising an optical fiber array 14 as the multi beam light source, a first lens 16 and a second lens 18, with the first lens 16 and the second lens 18 fixed and only the optical fiber array 14 provided movably, has been provided.

However, in the case the imaging magnification is changed by moving only the optical fiber array 14, as shown in FIGS. 8A to 8C, the image forming position of the light beam 11 is displaced. Moreover, since the light beam 11 transmitted the first lens 16 can be a diverging light, a parallel light or a converging light, the lens design is difficult.

SUMMARY OF THE INVENTION

In view of the above-mentioned facts, the present invention has been achieved, and an object thereof is to provide an exposing device and an imaging magnification adjusting method capable of changing the imaging magnification without the need of increasing the number of lenses or the risk of deteriorating the lens performance.

In order to achieve the object, a first aspect of the invention provides an exposing device comprising a light source which emits a plurality of light beams, a first lens provided on a light beam emitting side of the light source, a second lens provided on a light beam emitting side of the first lens for focusing the light beams on a surface to be irradiated, and a supporting means which supports the light source and the first lens movably from reference positions to positions corresponding to displacement amounts of a first distance and a second distance corresponding to a predetermined imaging magnification, the positions being determined based on an imaging characteristic representing the imaging magnification and corresponding to a displacement amount of the first distance between the light source and the first lens in the case that at least one of the light source and a first lens is moved from a reference position and a displacement amount of the second distance between the first lens and the second lens in the case that at least one of the first lens and the second lens is moved from a reference position, positions of the light source, the first lens and the second lens with respect to a predetermined imaging magnification being determined as the reference positions.

The light source emits a plurality of light beams. As the light source, for example, an optical fiber array with a plurality of optical fibers for emitting a laser beam disposed along a predetermined direction can be used. The first lens is provided on a light beam emitting side of the light source. The second lens for focusing on the surface to be irradiated the light beams emitted from the light source and transmitted the first lens is provided on a light beam emitting side of the first lens.

The supporting means supports the light source and the first lens movably from reference positions to positions corresponding to displacement amounts of a first distance and a second distance corresponding to a predetermined imaging magnification, the positions being determined based on an imaging characteristic representing the imaging magnification and corresponding to a displacement amount of the first distance between the light source and the first lens in the case that at least one of the light source and a first lens is moved from a reference position and a displacement amount of the second distance between the first lens and the second lens in the case that at least one of the first lens and the second lens is moved from a reference position, positions of the light source, the first lens and the second lens with respect to a predetermined imaging magnification being determined as the reference positions.

Here, the imaging magnification denotes the ratio of the focus position interval of the adjacent light beams focused on the surface to be irradiated with respect to the emitting position interval of adjacent light beams in the plurality of the light beams emitted from the light source.

The reference positions can be set at positions whereat the light source, the first lens and the second lens provide a telecentric optical system. In this case, the distance between the first lens and the second lens is the sum of the focal distance of the first lens and the focal distance of the second lens. The reference positions are not limited thereto, and they can be set at optional positions.

The imaging characteristic represents the imaging magnification corresponding to the displacement amount of the first distance from the light source to the first lens, that is, the moving amount of the light source, and the displacement amount of the second distance from the first lens to the second lens, that is, the moving amount of the first lens. The imaging characteristic is a characteristic to have the distance between the second lens and the surface to be irradiated substantially constant.

The light source and the first lens are supported independently movably from the reference positions to a position each corresponding to the displacement amount of the first distance or the second distance corresponding to the predetermined imaging magnification determined based on the imaging characteristic.

That is, since the light source and the first lens can be moved to a position corresponding to the predetermined imaging magnification, the imaging magnification can be changed easily without the need of increasing the number of lenses.

Moreover, a second aspect of the invention provides an exposing device further comprising a focal position adjusting supporting means, which simultaneously movably supports all of the light source, the first lens and the second lens for adjusting the focal position. Thereby, the focal position can be adjusted by moving the light source and the first lens based on the imaging characteristic even in the case the focal position is displaced so that the imaging magnification can be changed over accurately.

A third aspect of the invention provides an exposing device further comprising an inputting means which inputs the imaging magnification, a memory means which stores the imaging characteristic, a calculating means which calculates the displacement amount of the first distance and the second distance corresponding to the input imaging magnification based on the imaging characteristic, and a moving means which moves the light source and the first lens from the reference positions to a position corresponding to the displacement amount obtained as a result of calculation by the calculating means.

The inputting means is for inputting the imaging magnification. In the memory means, the imaging characteristic is stored.

The imaging characteristic can be table data representing the corresponding relationship between the displacement amount of the first distance and the second distance and the imaging magnification, a formula representing the corresponding relationship or the like.

The calculating means calculates the displacement amount of the first distance and the second distance corresponding to the input imaging magnification, that is, the moving amount of the light source and the first lens, respectively based on the imaging characteristic stored in the memory means.

The moving means moves the light source and the first lens from the reference positions to a position corresponding to the displacement amount obtained as a result of calculation by the calculating means. That is, it moves the light source to a position corresponding to the moving amount of the light source calculated by the calculating means as well as it moves the first lens to a position corresponding to the calculated moving amount of the first lens. Thereby, the imaging magnification can be adjusted automatically to a desired magnification.

A fourth aspect of the invention provides an exposing device further comprising an inputting means which inputs the imaging magnification, a memory means which stores table data representing a corresponding relationship between the displacement amount of the first distance and the second distance and the imaging magnification as the imaging characteristic, and a moving means which moves the light source and the first lens from the reference positions to a position corresponding to the displacement amount of the first distance and the second distance corresponding to the input imaging magnification calculated from the table data.

According to the invention, since the displacement amount of the first distance and the second distance corresponding to the input imaging magnification can be calculated from the table data, each displacement amount can be calculated quickly so that a high speed device can be provided.

Moreover, a fifth aspect of the invention provides an exposing device, wherein the memory means further stores focal position adjusting data for adjusting the focal position, and a focal position adjusting moving means is further provided which moves the light source, the first lens and the second lens entirely and simultaneously to a position corresponding to the displacement amount corresponding to the focal position adjusting data. Thereby, the focal position can be adjusted automatically. The focal position adjusting data can be a constant value or table data representing the corresponding relationship between the imaging magnification and the focal position.

Moreover, a sixth aspect of the invention provides an exposing device, wherein the memory means further stores error data of the imaging magnification, and an error adjusting moving means is further provided for moving at least one of the light source and the first lens to a position corresponding to the displacement amount corresponding to the error data.

Thereby, the error can be adjusted automatically. The error adjusting data can be a constant value or table data representing the corresponding relationship between the imaging magnification and the error.

Furthermore, a seventh aspect of the invention provides an exposing device, wherein the light source and the first lens are disposed such that the light beams emitted from the first lens diverges or converges regardless of the imaging magnification. Thereby, lens design can be facilitated.

Moreover, an eighth aspect of the invention provides an exposing device, wherein an imaging characteristic of a beam disposed at an end of the light beams is a characteristic making an inclination of a main light beam with respect to an optical axis of the light beams emitted from the second lens 0.01 rad or less. Thereby, even in the case the image plane is displaced, the image irregularity can be provided within a tolerance range.

Furthermore, a ninth aspect of the invention provides an exposing device, wherein an aperture having an opening for transmitting a part of the light flux of the light beams are further provided between the first lens and the second lens. Thereby, depth can further be provided.

A second invention provides an imaging magnification adjusting method for an exposing device comprising a light source emitting a plurality of light beams, a first lens provided on the light beam emitting side of the light source and a second lens provided on the light beam emitting side of the first lens for focusing the light beams on a surface to be irradiated, comprising the steps of inputting an imaging magnification, and finding a displacement amount of a first distance and a second distance corresponding to the input imaging magnification based on a imaging characteristic representing an imaging magnification and corresponding to the displacement amount of the first distance between the light source and the first lens in the case that at least one of the light source and the first lens is moved from a reference position and the displacement amount of the second distance between the first lens and the second lens in the case that at least one of the first lens and the second lens is moved from a reference position, positions of the light source, the first lens and the second lens with respect to a predetermined imaging magnification being determined as the reference positions, and moving the light source and the first lens from the reference positions to positions corresponding to the found displacement amount.

By adjusting the imaging magnification by the method, the imaging magnification can be changed over without the need of increasing the number of lenses or the risk of deteriorating the lens performance.

A third invention provides an exposing device comprising a light source which emits a plurality of light beams, a first lens provided on a light beam emitting side of the light source, a second lens provided on a light beam emitting side of the first lens for focusing the light beams on a surface to be irradiated, and a supporting device which supports the light source and the first lens movably to positions corresponding to displacement amounts of a first distance and a second distance corresponding to a predetermined imaging magnification, the positions being determined based on a relationship between a displacement amount of the first distance between the light source and the first lens in the case that at least one of the light source and the first lens is moved from a reference position, the displacement amount of the second distance between the first lens and the second lens in the case that at least one of the first lens and the second lens is moved from a reference position, and imaging magnification, positions of the light source, the first lens and the second lens with respect to a predetermined imaging magnification being determined as the reference positions.

BRIEF DESCRIPTION OF THE DRAWINGS

FIGS. 7A to 7C are diagrams for explaining the focal positions of the light beams of the exposing device according to the embodiment of the invention.

DESCRIPTION OF THE PREFERRED EMBODIMENTS

Figure 1:
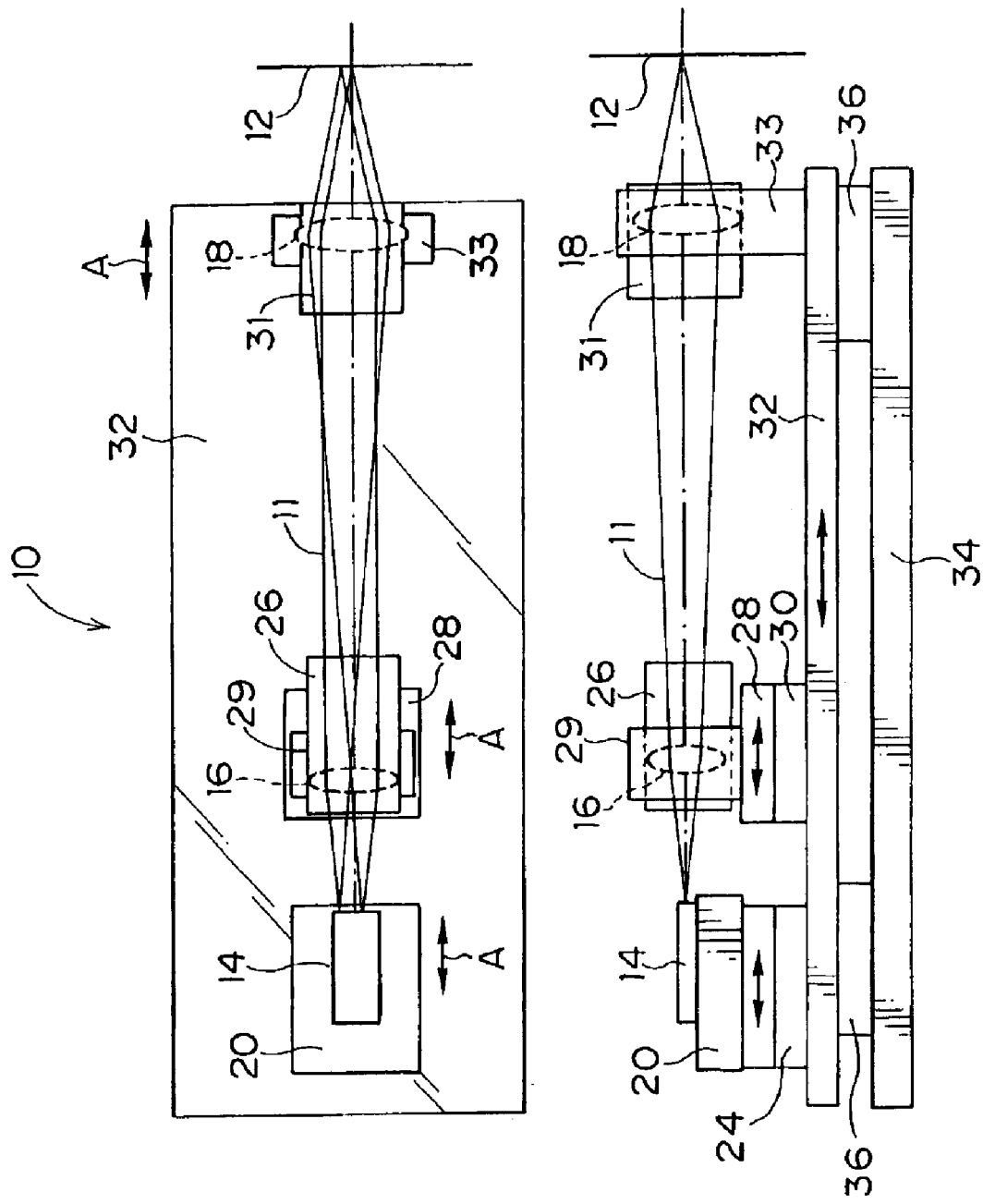
FIG. 1A is a schematic plan view of an exposing device according to an embodiment of the present invention.
FIG. 1B is a side view of FIG. 1A.

Hereinafter, with reference to the drawings, an embodiment of the present invention will be explained in detail. FIG. 1A is an upper view of an exposing device 10 according to this embodiment, and FIG. 1B is a side view of FIG. 1A.

As shown in FIGS. 1A and 1B, the exposing device 10 scans on a photosensitive drum 12 rotating in a predetermined direction (main scanning direction) with a light beam 11 modulated according to an image in a direction substantially orthogonal to the predetermined direction (sub scanning direction).

The exposing device 10 comprises an optical fiber array 14 with a plurality of unshown optical fibers disposed with a predetermined interval along the sub scanning direction, a first lens 16 provided on the light beam emitting side of the optical fiber array 14, and a second lens (image forming lens) 18 provided on the light beam emitting side of the first lens 16.

The optical fiber array 14 is mounted on a base seat 20. The base seat 20 is supported on a rail 24 movably along the optical axis direction of a light beam (laser beam) emitted from the optical fiber array 14 (arrow A direction in the figure).

Moreover, the first lens 16 is mounted in a casing 26. The casing 26 is supported by a supporting member 29 mounted on a base seat 28. The base seat 28 is supported on a rail 30 movably along the arrow A direction in the figure.

Furthermore, the second lens 18 is mounted in a casing 31. The casing 31 is supported by a supporting member 33 mounted on a base seat 32.

The rail 24 and the rail 30 are mounted on the base seat 32. The base seat 32 is supported on a rail 36 mounted on a base seat 34 movably in the arrow A direction.

Accordingly, the optical fiber array 14 and the first lens 16 can be moved in the arrow A direction each independently as well as the optical fiber array 14, the first lens 16 and the second lens 18 can be moved integrally and simultaneously in the arrow A direction. That is, the exposing device 10 can adjust the distance between the optical fiber array 14 and the first lens 16 and the distance between the first lens 16 and the second lens 18 as well as it can adjust the distance between the second lens 18 and the photosensitive drum 12. Although details will be described later, the imaging magnification can be changed over by moving the optical fiber array 14 and the first lens 16 each independently as well as the optical fiber array 14 and the first lens 16 are further moved by the moving amount for the error in the case an error is generated for example in the imaging magnification after the changeover. The imaging magnification can be changed over accurately by adjusting (correcting) the focus position by moving the entirety of the optical fiber array 14, the first lens 16 and the second lens 18 for the displacement of the focus position generated at the time. A configuration capable of moving the optical fiber array 14, the first lens 16 and the second lens 18 each independently can be adopted as well.

Figure 2:
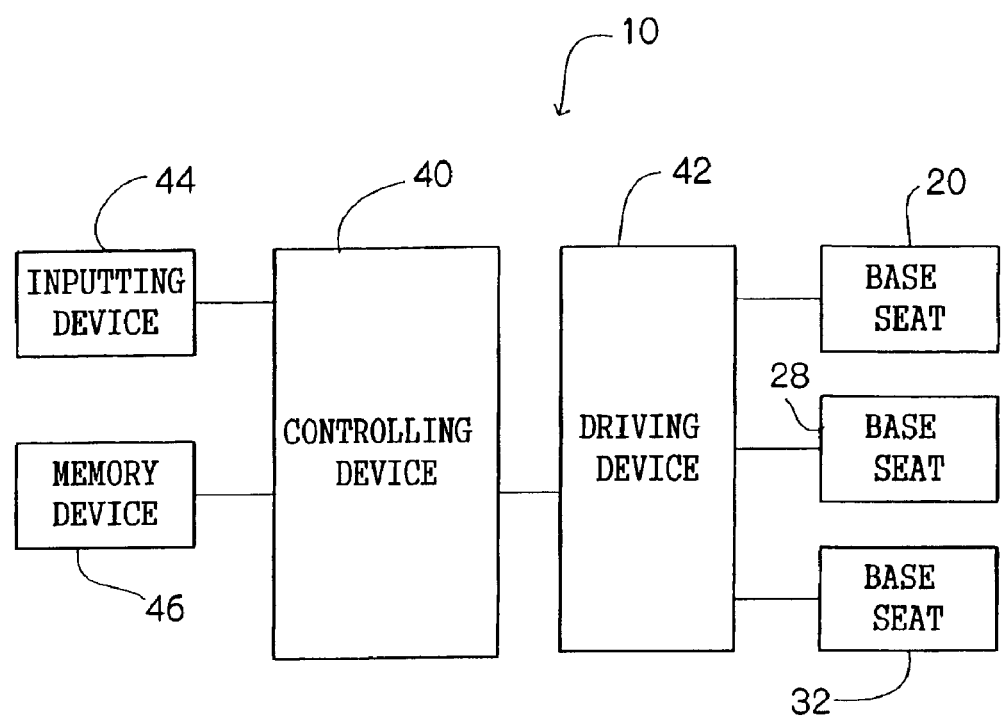
FIG. 2 is a schematic block diagram of the exposing device according to the embodiment of the invention.

FIG. 2 is a schematic block diagram of the exposing device 10. As shown in FIG. 2, the exposing device 10 comprises a controlling device 40. The controlling device 40 is connected with a driving device 42 for driving the base seats 20, 28, 32, an inputting device 44 for inputting the resolution and a memory device 46 for storing a program later described, a moving amount table for finding the moving amount of the optical fiber array 14 and the first lens 16 corresponding to the input resolution, error data for adjusting the error of the imaging magnification, focal position adjusting data for adjusting the focal position or the like. An operator can input (select) a desired resolution among a plurality of resolutions, such as 2,400 dpi, 2,438 dpi, and 2,540 dpi by the inputting device 44.

Moreover, the optical system of the exposing device 10 provides a so-called telecentric optical system, wherein the main light beam is parallel with the optical axis in the case the first lens 16 and the second lens 18 are disposed such that the distance between the first lens 16 and the second lens 18 is the sum of the focal distance f1 of the first lens 16 and the focal distance f2 of the second lens 18.

In the telecentric optical system, the imaging magnification m can be determined according to the ratio of the focal distance f1 and the focal distance f2, and the imaging magnification cannot be changed over. Here, the imaging magnification denotes the ratio of the interval $\Delta y$ of the focus position on the photosensitive drum 12 with respect to the arrangement interval $\Delta x$ of the optical fibers in the optical fiber array 14 ($\Delta y/\Delta x$) (see FIG. 3).

In this embodiment, the resolution is changed over by moving the optical fiber array 14 and the first lens 16 in the optical axis direction so as to be displaced from the telecentric optical system arrangement in a tolerance range.

Figure 3:
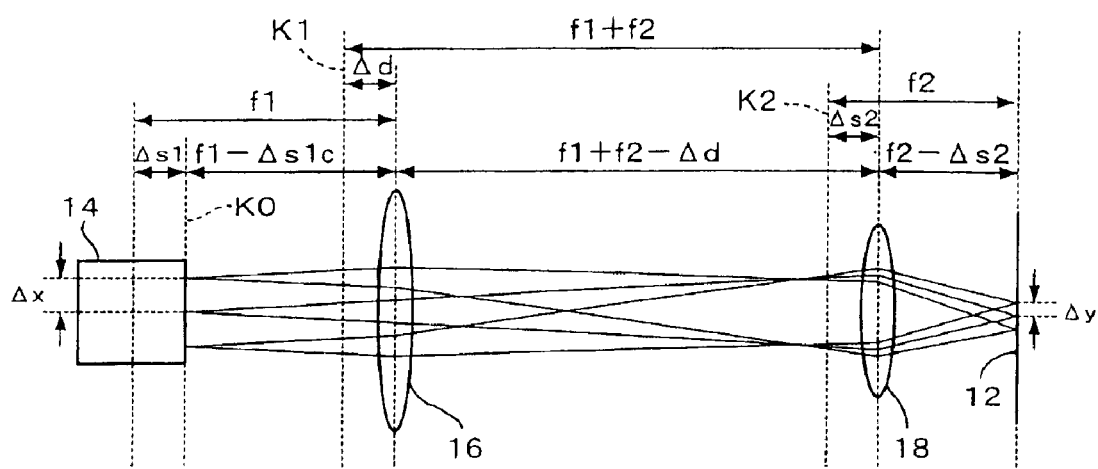
FIG. 3 is a diagram for explaining the optical system of the exposing device according to the embodiment of the invention.

As shown in FIG. 3, the imaging magnification m can be represented by the following formula with the premise that the moving amount of the optical fiber array 14 from the reference position K0 (the position at which the distance from the first lens 16 is f1−$\Delta$s1c) in the optical axis direction is $\Delta$s1, and the moving amount of the first lens 16 from the reference position K1 (the position at which the distance from the second lens 18 is (f1+f2)) in the optical axis direction is $\Delta$d:

$$m=(f1 \times f2)/(f1^2+\Delta s1 \times \Delta d) \quad (1)$$

From the above-mentioned formula (1), in the case the optical fiber array 14, the first lens 16 and the second lens 18 are arranged so as to provide a telecentric optical system, that is, in the case $\Delta$d=0, as mentioned above, the imaging magnification m is the ratio of the focal distance f1 and the focal distance f2 (f2/f1). $\Delta$s1 is a positive value in the case the optical fiber array 14 is disposed on the right side with respect to the reference position K0, and it is a negative value in the case it is disposed on the left side with respect to the reference position K0. Similarly, $\Delta$d is a positive value in the case the first lens 16 is disposed on the right side with respect to the reference position K1, and it is a negative value in the case it is disposed on the left side with respect to the reference position K1.

Moreover, in the case the optical fiber array 14, the first lens 16 and the second lens 18 are disposed so as to provide a telecentric optical system, the main light beam of the total light beams transmitting the second lens 18 and reaching the photosensitive drum 12 is parallel to the optical axis.

Figure 4:
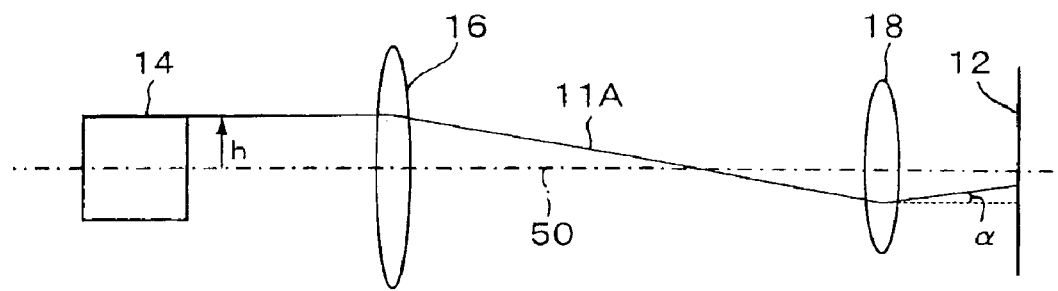
FIG. 4 is a diagram for explaining the optical system of the exposing device according to the embodiment of the invention.

Here, as shown in FIG. 4, with the premise that the angle formed by the main light beam 11A of the light beam 11 (beam disposed at the end of the light beam 11) transmitting the second lens 18 and reaching the photosensitive drum 12 and the line parallel to the optical axis 50 (line shown by the dotted line in the figure), that is, the inclination of the main light beam 11A from the optical axis is $\alpha$ (rad), $\alpha$ can be represented by the following formula:

$$\alpha \approx h \times \Delta d/(f1 \times f2) \quad (2)$$

The value $\alpha$ represents the parallelism of the main light beam 11A and the optical axis, that is, the telecentric property. It is preferable that the inclination $\alpha$ is set for example at 10 mrad or less. In the case the inclination $\alpha$ is 10 mrad or less, that is, 0.01 rad or less, even in the case the image plane is displaced by for example vibration of the photosensitive drum 12, the image irregularity can be in a tolerance range.

As shown in FIG. 4, h represents the image height from the optical axis 50 to the outputting end of the optical fiber array 14. Moreover, as shown in FIG. 3, with the premise that the moving amount of the second lens 18 from the reference position K2 (the position at which the distance from the photosensitive drum 12 is f2) in the optical axis direction is $\Delta$s2, $\Delta$s2 can be represented by the following formula:

$$\Delta s2=(f2^2 \times \Delta s1)/(f1^2+\Delta s1 \times \Delta d) \quad (3)$$

$\Delta$s2 is a positive value in the case the second lens 18 is disposed on the right side with respect to the reference position K2, and it is a negative value in the case it is disposed on the left side with respect to the reference position K2.

Here, with the premise that the imaging magnification in the case of a telecentric optical system is $m_t$ (=f2/f1), and the ratio of the increase of the imaging magnification with respect to the imaging magnification $m_t$ (hereinafter referred to as the imaging magnification factor) is a, the imaging magnification m can be represented by the following formula:

$$m=m_t \times (1+a) \quad (4)$$

From the above-mentioned formulae (1), (2), (4), the above-mentioned formula (3) can be represented by the following formula:

$$\Delta s2=m_t \times h \times (a/\alpha) \quad (5)$$

As it is apparent from the above-mentioned formula (5), $\Delta$s2 can be determined substantially by two parameters of the imaging magnification factor a and the inclination $\alpha$.

Here, as an example, it is preferable that $\Delta$s2 is always constant such that the light beam focal position on the photosensitive drum 12 is not displaced even in the case the imaging magnification is changed by moving the optical fiber array 14 and the first lens 16 in the optical axis direction. From the above-mentioned formula (5), in order to keep $\Delta$s2 constant, as shown in the following formula, the imaging magnification factor a and the inclination $\alpha$ need to be proportional:

$$\alpha = c0 \times a \quad (6)$$

Here, c0 is a constant. From the above-mentioned formulae (2) and (6), the following formula can be provided:

$$\Delta d = f1 \times f2 \times a \times c0/h \quad (7)$$

Moreover, from the above-mentioned formulae (1), (4), (7), the following formula can be provided:

$$\Delta s1 = f1 \times h/((1+a) \times c0 \times f2) \quad (8)$$

By moving the optical fiber array 14 and the first lens 16 each in the optical axis direction according to the above-mentioned formulae (7) and (8), the imaging magnification m can be changed while constantly maintaining $\Delta$s2.

Here, with the focal distance f1 of the first lens 16 set at 115 (mm) and the focal distance f2 of the second lens 18 set at 34.5 (mm), the imaging magnification $m_t$ in the case of a telecentric optical system becomes 0.3.

As mentioned above, since the image irregularity can be in a tolerance range if the inclination $\alpha$ is 0.01 rad or less, even in the case the image plane is displaced due to decentering of the photosensitive drum 12, in this embodiment, the optical system is provided so as to have the inclination $\alpha$ by 0.01 rad or less with the changeover range of the imaging magnification m in 0.28 to 0.32.

In the case of m=0.28, from the above-mentioned formula (4), a=−0.00667, and in the case of m=0.32, from the above-mentioned formula (4), a=0.0667. Since α=0.01 rad in the case of m=0.32 (a=0.0667), the constant c0 is 0.15 (=0.01/0.0667) from the above-mentioned formula (6).

With the focal distance f1, the focal distance f2 and the constant c0 as the above-mentioned values and the image height h is set at for example 2.9 (mm), by substituting the parameters in the above-mentioned formulae (7) and (8), the following formula can be obtained:

$$\Delta d = 205.2 \times a \quad (9)$$

$$\Delta s1 = 64.4/(1+a) \quad (10)$$

Figure 5:
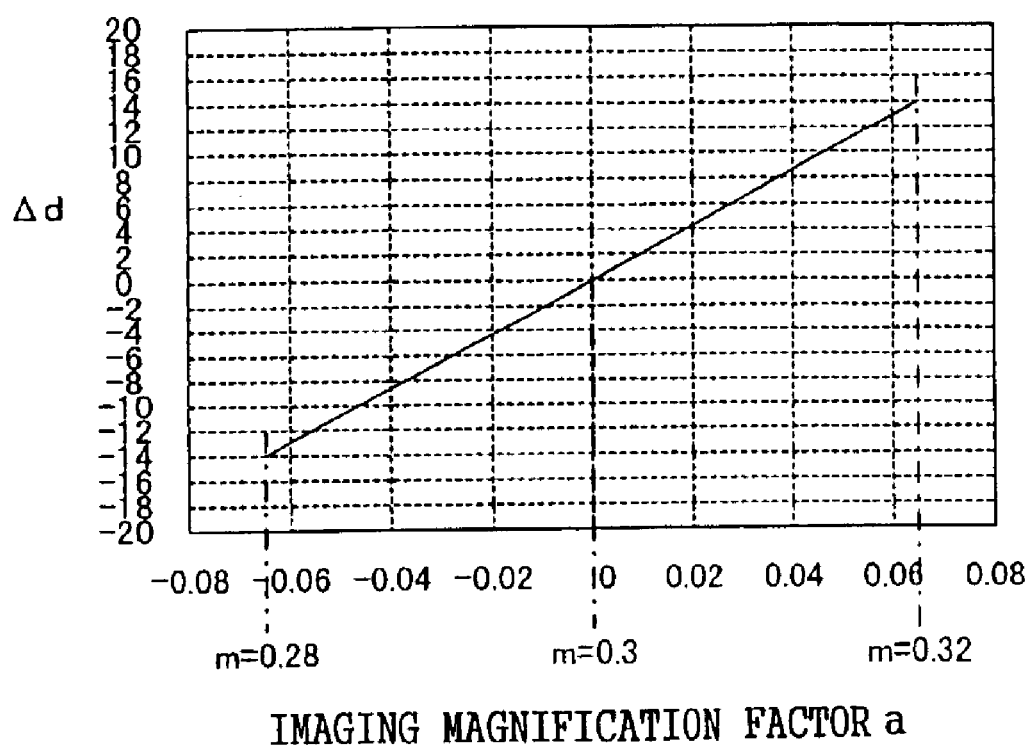
FIG. 5 is a graph showing the relationship between an imaging magnification factor and the moving amount of a first lens.
Figure 6:
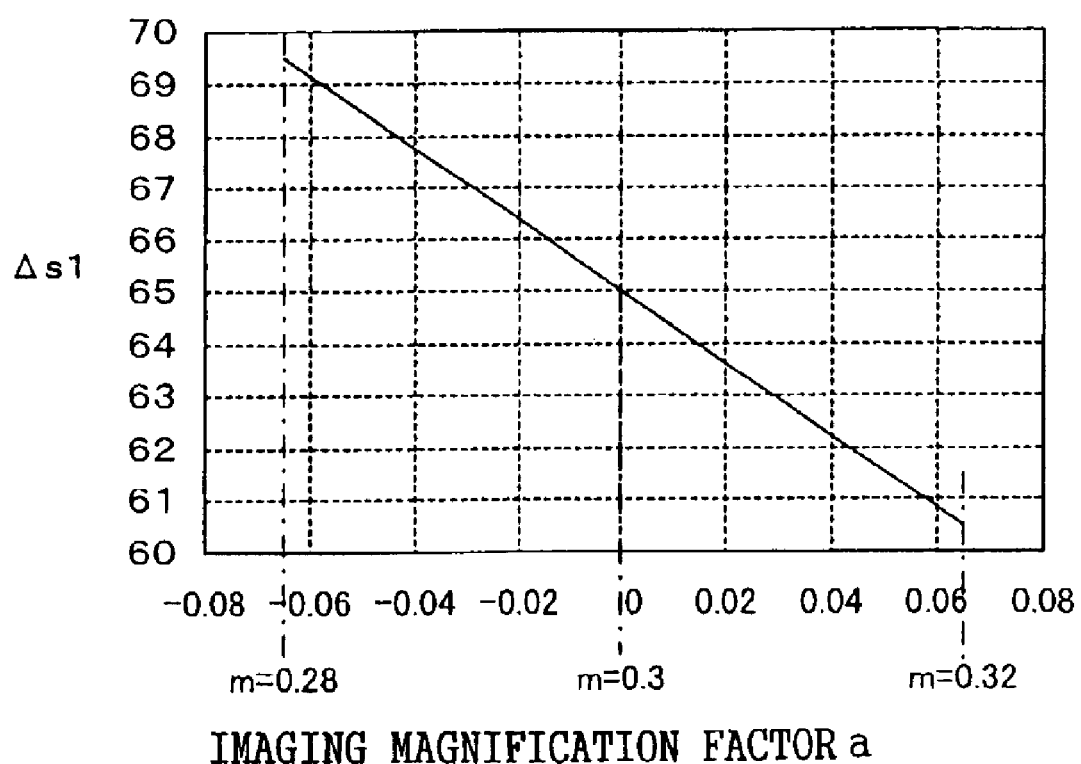
FIG. 6 is a graph showing the relationship between the imaging magnification factor and the moving amount of an optical fiber array.

That is, Δd is proportional to a, and Δs1 is proportional to 1/(1+a). A graph with a in a range of −0.0667 (m=0.28) to 0.0667 (m=0.32) is shown in FIGS. 5 and 6 each for the above-mentioned formulae (9) and (10). The graphs shown in FIGS. 5, 6 correspond to the imaging characteristic of the invention.

In the case of having the imaging magnification m smaller than the imaging magnification $m_r$ (=0.3) (in the case of making the resolution higher), the first leans 16 is moved so as to have Δd made smaller as shown in FIG. 5 as well as the optical fiber array 14 is moved so as to have Δs1 made larger as shown in FIG. 6.

In contrast, in the case of having the imaging magnification m larger than the imaging magnification $m_r$ (in the case of making the resolution lower), the first lens 16 is moved so as to have Δd made larger as shown in FIG. 5 as well as the optical fiber array 14 is moved so as to have Δs1 made smaller as shown in FIG. 6.

Accordingly, by moving the optical fiber array 14 and the first lens 16 simultaneously according to the above-mentioned formulae (9) and (10), the imaging magnification m can be changed while constantly maintaining Δs2 as shown in FIGS. 7A to 7C. Since Δs2 is constant, generation of the curvature of field or collapse of the spot shape of the light beam focused on the photosensitive drum 12 can be prevented.

Moreover, as shown in FIG. 6, Δs1 is a positive value in a range with a 0.28 to 0.32 imaging magnification m. That is, since the optical fiber array 14 is disposed on the inner side with respect to the focal distance f1 of the first lens 16, as shown in FIGS. 7A to 7C, even in the case the imaging magnification m is changed, the light beam 11 output from the first lens 16 is a diverging light. Therefore, it is advantageous in that the lens design can be facilitated.

Figures 8A, 8B, 8C:
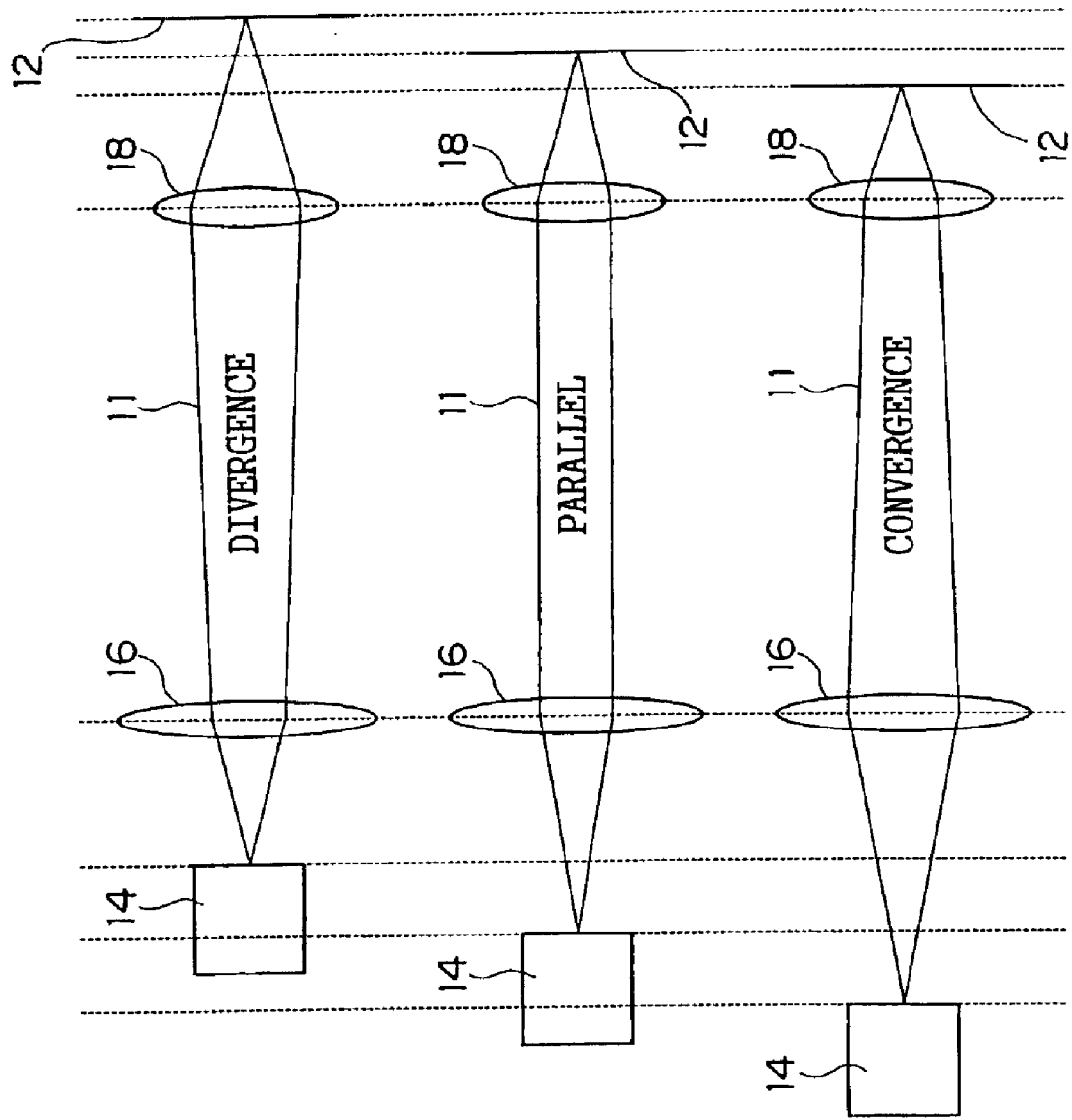
FIGS. 8A to 8C are diagrams for explaining the focal positions of the light beams of a conventional exposing device.

In contrast, as shown in FIGS. 8A to 8C, in the case the imaging magnification is changed by moving only the optical fiber array 14 with the first lens 16 and the second lens 18 fixed as in the conventional embodiment, the focus position of the light beam 11 is displaced. Moreover, since the light beam 11 output from the first lens 16 can be a diverging light, a parallel light or a converging light, it is disadvantageous in that the lens design is difficult.

Although the reference position K0 of the optical fiber array 14 as a position with the distance from the first lens 16 as f1−Δs1c, the reference position K1 of the first lens 16 as a position with the distance from the second lens 18 as (f1+f2), and the reference position K2 of the second lens 18 as a position with the distance from the photosensitive drum 12 as f2, that is, the positions of the optical fiber array 14, the first lens 16 and the second lens 18 in the case of the imaging magnification m is 0.3 are presented as the reference positions in this embodiment, they are not limited thereto and other positions can be used as the reference positions.

Next, operation of this embodiment will be explained.

Figure 9:
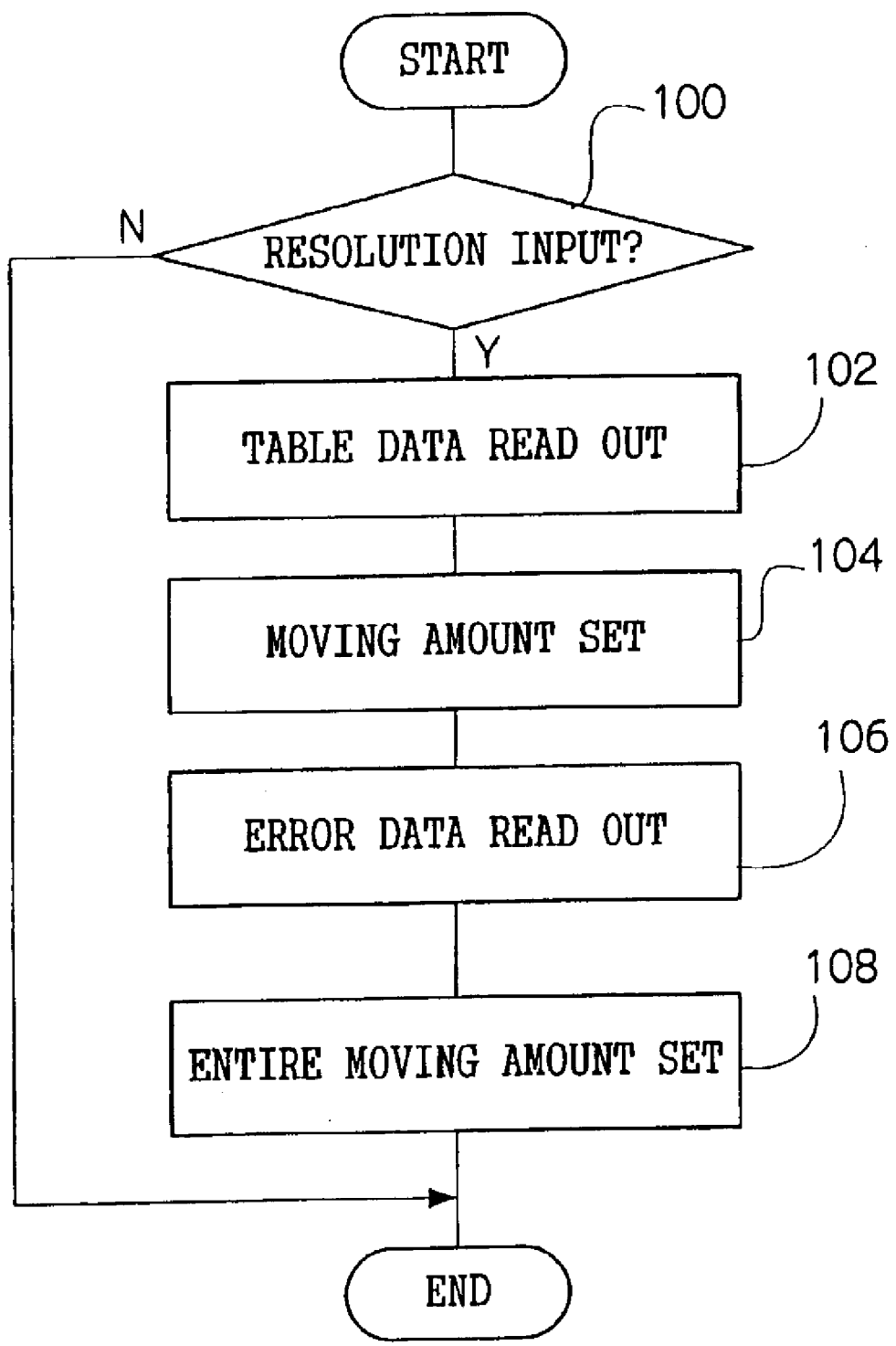
FIG. 9 is a flow chart of the control routine to be performed by a controlling device.

FIG. 9 is a flow chart of a control routine to be performed by the controlling device 40. The control routine is performed per predetermined time. The memory device 46 stores a moving amount table showing the corresponding relationship between the resolution corresponding to the imaging magnification factor a and the moving amount Δd of the first lens 16 as shown in FIG. 5, a moving amount table showing the corresponding relationship between the resolution corresponding to the imaging magnification factor a and the moving amount Δs1 of the optical fiber array 14 as shown in FIG. 6, error data for adjusting the imaging magnification and focal position adjusting data for adjusting the focal position. The error data and the focal position adjusting data are preliminarily prepared by the actual measurement or the like.

As shown in FIG. 9, whether or not the resolution is input from the inputting device 44 is judged in the step 100. In the case the resolution is not input, it is denied in the step 100 so as to finish the routine.

In contrast, in the case the resolution is input, it is affirmed in the step 100, and in the next step 102, the moving amount table stored in the memory device 46 is referred to so as to read out Δd and Δs1 corresponding to the input resolution.

Then, by outputting the read out Δd and Δs1 to the driving device 42 in the next step 104, the moving amounts of the first lens 16 and the optical fiber array 14 from the reference positions in the optical axis direction are set.

Thereby, the driving device 42 moves the first lens 16 by driving the base seat 28 so as to dispose the first lens 16 at a position away from the reference position K1 by Δd and moves the optical fiber array 14 by driving the base seat 20 so as to dispose the optical fiber array 14 at a position away from the reference position K0 by Δs1.

Next, by reading out the error data and the focal position adjusting data from the memory device 46 in the step 106 and outputting the error data and the focal position adjusting data to the driving device 42 in the next step 108, the moving amount of the optical fiber array 14 and the first lens 16 for the error data and the entire moving amount of the optical fiber array 14, the first lens 16 and the second lens 18 for the focal position adjusting data are set.

Thereby, the driving device 42 moves the optical fiber array 14 and the first lens 16 by the moving amount for the set error data. Then, it drives the base seat 32 for moving the entirety of the optical fiber array 14, the first lens 16 and the second lens 18 in the optical axis direction by the moving amount for the focal position adjusting data. In the case there is no error or displacement of the focal position, the process of the steps 106 and 108 can be eliminated.

In the case there is an error after changing over image magnification by accordingly moving the first lens 16 and the optical fiber array 14, the error is corrected by moving the optical fiber array 14 and the first lens 16 for the error data, and the focal position displacement is adjusted by further moving the optical fiber array 14, the first lens 16 and the second lens 18 entirely. Thereby, the imaging magnification can be changed over accurately.

The error data and the focal position adjusting data may be included preliminarily in the moving amount table. That is, the moving amount data can be produced in a form including the error data and the focal position adjusting data. Thereby, the imaging magnification can be changed over quickly by one time movement.

Moreover, although the case of automatically changing over the imaging magnification based on the table data is explained in this embodiment, it is also possible to adopt a configuration capable of moving the optical fiber array 14 and the first lens 16 to positions corresponding to a plurality of preset imaging magnifications so that the optical fiber array 14 and the first lens 16 can be set at the above-mentioned positions. Furthermore, it is also possible to provide the entirety of the optical fiber array 14, the first lens 16 and the second lens 18 manually movably. Thereby, the optical fiber array 14, the first lens 16 and the second lens 18 can be moved easily in the checkup or the like in the production line or the like.

Figure 10:
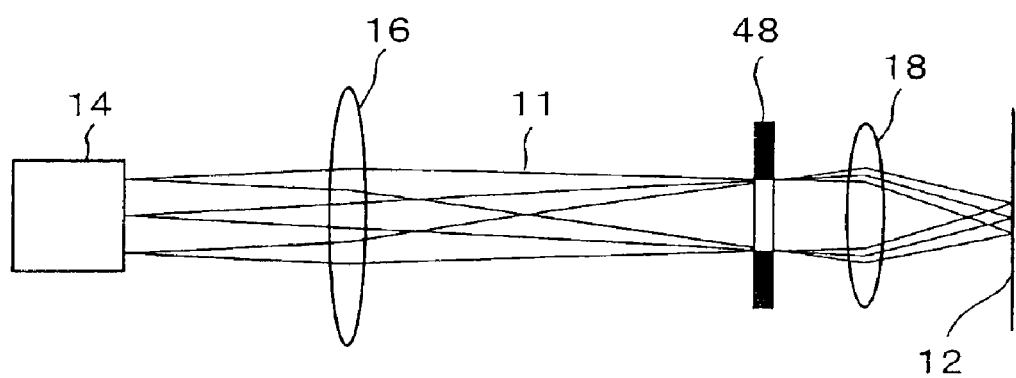
FIG. 10 is a diagram showing the optical system of the exposing device in the case of using an aperture.

Moreover, in the case of a high imaging magnification, the light collecting angle of the light beam to be collected on the photosensitive drum 12 can be large so that the focal depth tolerated for exposure can be shallow in some cases. Then, as shown in FIG. 10, an aperture 48 having an opening for transmitting a part of the light flux of the light beam 11 can further be provided between the first lens 16 and the second lens 18.

Figure 11A:
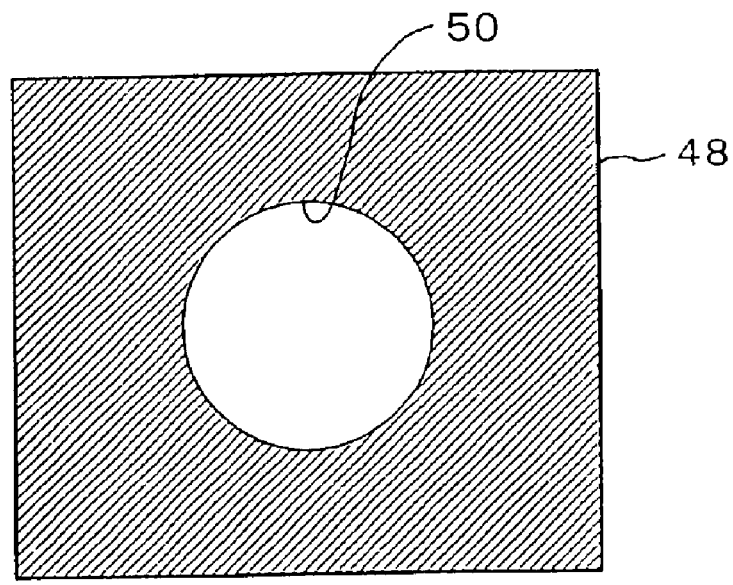
FIG. 11A is a front view of the aperture.
Figure 11B:
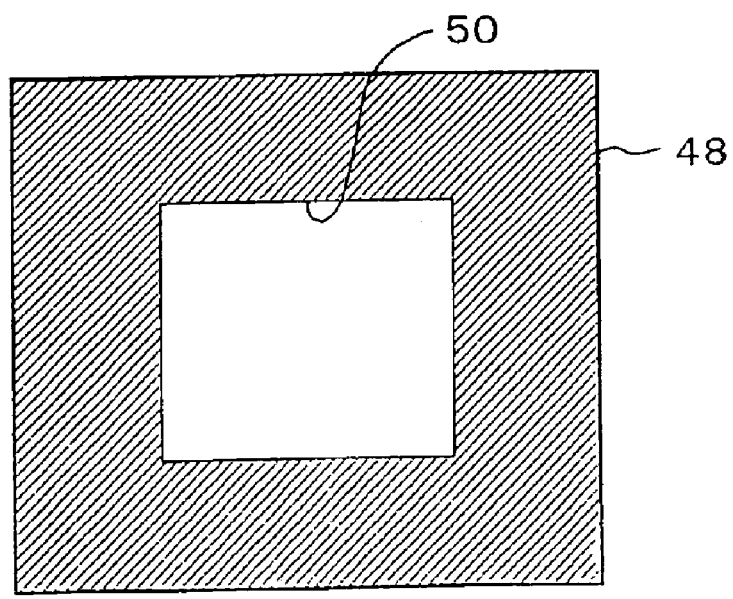
FIG. 11B is a front view of the aperture according to a modified embodiment.

The aperture 48 is formed in for example a rectangular blocking plate-like form as shown in FIG. 11A, with a round opening part 50 provided in the center part thereof. The axis center of the opening part 50 coincide with the optical axis of the light flux of the light beam 11, with the opening part 50 formed slightly smaller than the area of the light flux. The shape of the opening part 50 of the aperture 48 is not limited to the round shape, and it may be a rectangular shape as shown in FIG. 11B, or another polygonal shape.

Since the opening part 50 is formed slightly smaller than the light flux area, a part of the light flux (foot part) is blocked by the aperture 48 by the circumferential rim of the opening part 50. That is, the light flux area reaching the second lens 18 can be same either in the case of a low resolution or a high resolution so that the light collecting angle on the photosensitive drum 12 by the second lens 18 can be constant.

Accordingly, since the light flux area with the light collecting angle made larger is blocked by the aperture 50 so that the light flux reaching the second lens 18 can be substantially same regardless of the imaging magnification, that is, the resolution, the light collecting angle cannot be made larger so that the same focal depth can be obtained even in the case of changing over the imaging magnification.

Figure 12:
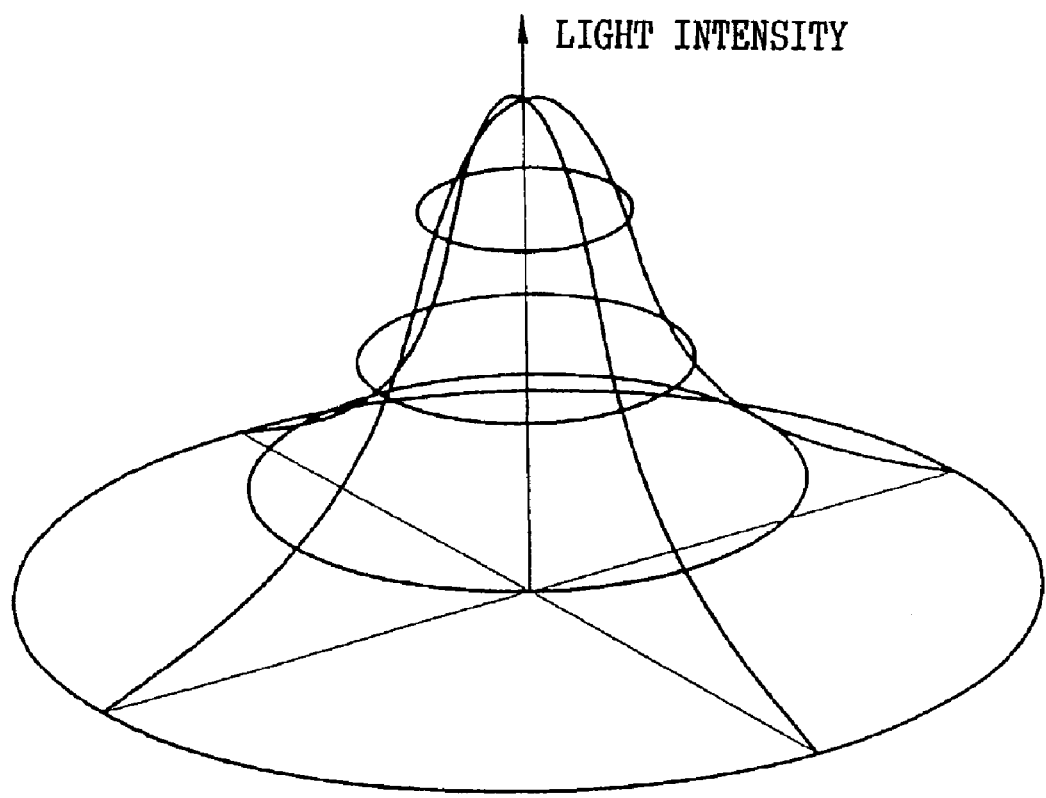
FIG. 12 is a three-dimensional model diagram of the light strength distribution.

Moreover, in the case a part of the light flux is blocked, deterioration of the light amount is problematic. However, the laser beam L intensity distribution at the aperture 50 arrangement position has a mountain-like characteristic with the highest intensity at the center and the intensity lowered two-dimensionally to the four corners as shown in FIG. 12. Therefore, since the area blocked by the aperture 50 is the foot part of the intensity distribution, even in the case the circumferential rim part is blocked by the aperture 50, the entire light amount cannot be lowered in proportion to the blocked area, and thus it is not problematic.

What is claimed is:

1. An exposing device comprising:
   a light source which emits a plurality of light beams;
   a first lens provided on a light beam emitting side of the light source;
   a second lens provided on a light beam emitting side of the first lens for focusing the light beams on a surface to be irradiated; and
   a supporting means which supports the light source and the first lens movably from reference positions to positions corresponding to displacement amounts of a first distance and a second distance corresponding to a predetermined imaging magnification, the positions being determined based on an imaging characteristic representing the imaging magnification and corresponding to a displacement amount of the first distance between the light source and the first lens in the case that at least one of the light source and a first lens is moved from a reference position and a displacement amount of the second distance between the first lens and the second lens in the case that at least one of the first lens and the second lens is moved from a reference position, positions of the light source, the first lens and the second lens with respect to a predetermined imaging magnification being determined as the reference positions.

2. The exposing device according to claim 1, further comprising a focal position adjusting supporting means which simultaneously movably supports all of the light source, the first lens and the second lens for adjusting the focal position.

3. The exposing device according to claim 1, further comprising:
   an inputting means which inputs the imaging magnification;
   a memory means which stores the imaging characteristic;
   a calculating means which calculates the displacement amount of the first distance and the second distance corresponding to the input imaging magnification based on the imaging characteristic; and
   a moving means which moves the light source and the first lens from the reference positions to a position corresponding to the displacement amount obtained as a result of calculation by the calculation means.

4. The exposing device according to claim 3, wherein:
   the memory means further stores focal position adjusting data for adjusting the focal position; and
   a focal position adjusting moving means is further provided which moves the light source, the first lens and the second lens entirely and simultaneously to positions corresponding to the displacement amount corresponding to the focal position adjusting data.

5. The exposing device according to claim 3, wherein:
   the memory means further stores error data of the imaging magnification; and
   an error adjusting moving means is further provided which moves at least one of the light source and the first lens to a position corresponding to the displacement amount corresponding to the error data.

6. The exposing device according to claim 1, further comprising:
   an inputting means which inputs the imaging magnification;
   a memory means which stores table data representing a corresponding relationship between the displacement amount of the first distance and the second distance and the imaging magnification as the imaging characteristic; and
   a moving means which moves the light source and the first lens from the reference positions to a position corresponding to the displacement amount of the first distance and the second distance corresponding to the input imaging magnification calculated from the table data.

7. The exposing device according to claim 1, wherein the light source and the first lens are disposed such that the light beams emitted from the first lens diverges or converges regardless of the imaging magnification.

8. The exposing device according to claim 1, wherein an imaging characteristic of a beam disposed at an end of the light beams is a characteristic making an inclination of a main light beam with respect to an optical axis of the light beams emitted from the second lens 0.01 rad or less.

9. The exposing device according to claim 1, wherein an aperture having an opening for transmitting a part of a light flux of the light beams are further provided between the first lens and the second lens.

10. The exposing device according to claim 1, wherein said supporting means comprises a first adjusting support means and a second adjusting support means which simultaneously movably support the light source and the first lens, respectively, for adjusting the focal position.

11. An imaging magnification adjusting method for an exposing device comprising a light source emitting a plurality of light beams, a first lens provided on a light beam emitting side of the light source and a second lens provided on a light beam emitting side of the first lens for focusing the light beams on a surface to be irradiated, comprising the steps of:

inputting an imaging magnification;

finding a displacement amount of a first distance and a second distance corresponding to the input imaging magnification based on an imaging characteristic representing an imaging magnification and corresponding to the displacement amount of the first distance between the light source and the first lens in the case that at least one of the light source and the first lens is moved from a reference position and the displacement amount of the second distance between the first lens and the second lens in the case that at least one of the first lens and the second lens is moved from a reference position, positions of the light source, the first lens and the second lens with respect to a predetermined imaging magnification being determined as the reference positions; and moving the light source and the first lens from the reference positions to positions corresponding to the found displacement amount.

12. The imaging magnification adjusting method according to claim 11, further comprising the steps of further storing focal position adjusting data for the focal position adjustment, and moving the entirety of the light source, the first lens and the second lens simultaneously to positions corresponding to the displacement amount corresponding to the focal position adjusting data.

13. The imaging magnification adjusting method according to claim 11, further comprising simultaneously moving a first adjusting support means and a second adjusting support means of the supporting means, which support the light source and the first lens, respectively, for adjusting the focal position.

14. An exposing device comprising:

a light source which emits a plurality of light beams;

a first lens provided on a light beam emitting side of the light source;

a second lens provided on a light beam emitting side of the first lens for focusing the light beams on a surface to be irradiated; and a supporting device which supports the light source and the first lens movably to positions corresponding to displacement amounts of a first distance and a second distance corresponding to a predetermined imaging magnification, the positions being determined based on a relationship between a displacement amount of the first distance between the light source and the first lens in the case that at least one of the light source and the first lens is moved from a reference position, the displacement amount of the second distance between the first lens and the second lens in the case that at least one of the first lens and the second lens is moved from a reference position, and imaging magnification, positions of the light source, the first lens and the second lens with respect to a predetermined imaging magnification being determined as the reference positions.

15. The exposing device according to claim 14, further comprising a focal position adjusting supporting device which simultaneously movably supports all of the light source, the first lens and the second lens for adjusting the focal position.

16. The exposing device according to claim 14, further comprising:

an inputting device which inputs the imaging magnification;

a memory device which stores the relationship; and a calculating/moving device which calculates the displacement amount of the first distance and the second distance corresponding to the input imaging magnification based on the relationship and moves the light source and the first lens to positions corresponding to the displacement amount obtained as a result of the calculation.

17. The exposing device according to claim 16, wherein:

the memory device further stores focal position adjusting data for adjusting the focal position; and the moving device further moves the light source, the first lens and the second lens entirely and simultaneously to positions corresponding to the displacement amount corresponding to the focal position adjusting data.

18. The exposing device according to claim 16, wherein:

the memory device further stores error data of the imaging magnification; and the moving device moves at least one of the light source and the first lens to a position corresponding to the displacement amount corresponding to the error data.

19. The exposing device according to claim 14, further comprising:

an inputting device which inputs the imaging magnification;

a memory device which stores table data representing a corresponding relationship between the displacement amount of the first distance and the second distance and the imaging magnification as the relationship; and a moving device which moves the light source and the first lens to a position corresponding to the displacement amount of the first distance and the second distance corresponding to the input imaging magnification calculated from the table data.

20. The exposing device according to claim 14, wherein the light source and the first lens are disposed such that the light beams emitted from the first lens diverges or converges regardless of the imaging magnification.

21. The exposing device according to claim 14, an inclination of a main light beam with respect to an optical axis of the light beams emitted from the second lens are 0.01 rad or less.

22. The exposing device according to claim 14, wherein an aperture having an opening for transmitting a part of a light flux of the light beams are further provided between the first lens and the second lens.

23. The exposing device according to claim 14, wherein said supporting means comprises a first adjusting support means and a second adjusting support means which simultaneously movably support the light source and the first lens, respectively, for adjusting the focal position.

* * * * *